(No Model.) 2 Sheets—Sheet 1.
P. B. STILL.
COMBINED FEED CUTTER, THRASHER, AND SEPARATOR.

No. 437,803. Patented Oct. 7, 1890.

Witnesses
Inventor
P B Still.
By his Attorney

THE NORRIS PETERS CO., PHOTO-LITHO., WASHINGTON, D. C.

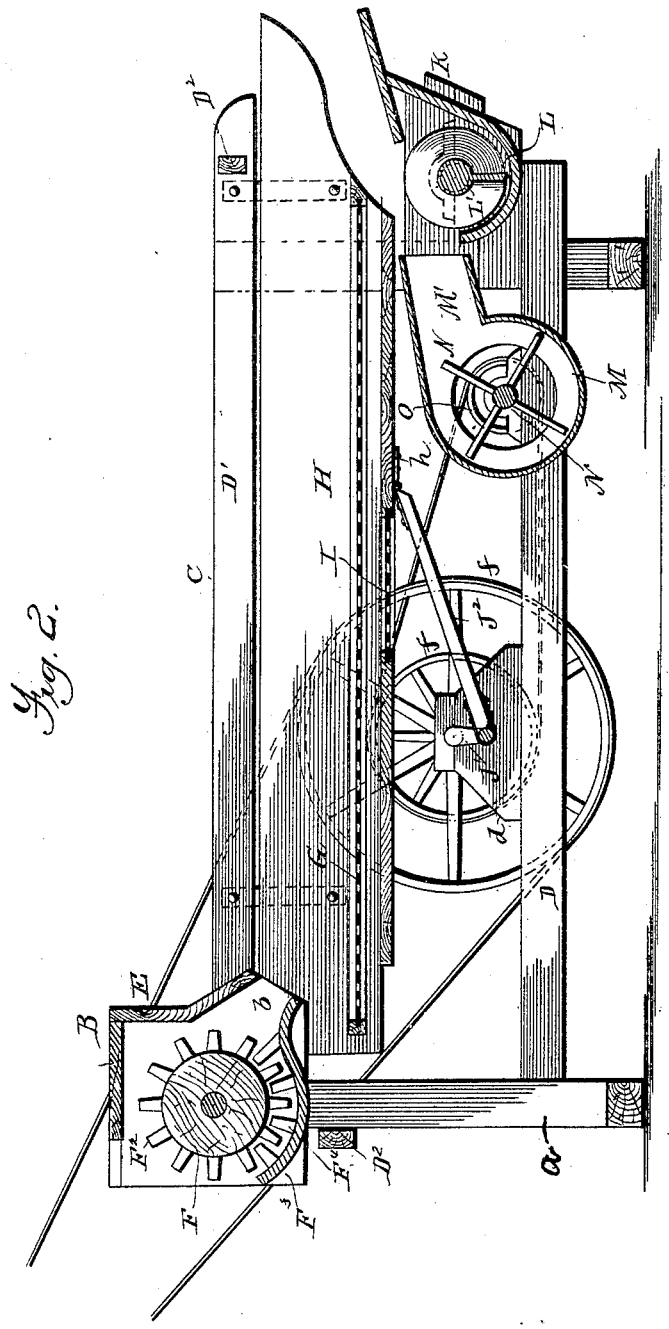

UNITED STATES PATENT OFFICE.

PHILLIP BRIGGS STILL, OF WOODSTOCK, ILLINOIS.

COMBINED FEED-CUTTER, THRASHER, AND SEPARATOR.

SPECIFICATION forming part of Letters Patent No. 437,803, dated October 7, 1890.

Application filed April 9, 1890. Serial No. 347,198. (No model.)

*To all whom it may concern:*

Be it known that I, PHILLIP BRIGGS STILL, a citizen of Woodstock, in the county of McHenry and State of Illinois, have invented certain new and useful Improvements in a Combined Feed-Cutter, Thrasher, and Separator; and I do hereby declare the following to be a full, clear, and exact description of the invention, such as will enable others skilled in the art to which it appertains to make and use the same.

My invention relates to a combined feed-cutter, thrasher, and separator, its object being to provide a thrashing apparatus and sheller so constructed, arranged, and geared with a feed-cutter that grain—such as corn, oats, &c.—including the stalks fed to the cutter, will be separated and cleaned and the stalks cut up by the cutter into feed.

A further object is to construct and arrange a thrasher in such manner that when connected to and geared with a feed-cutter, grain, including stalks, &c., fed to such combined apparatus will be separated from the stalks, cleaned, and conveyed from the machine, and at the same time the stalks will be cut up into feed and delivered from the machine at a different point from which the grain is delivered.

With these objects in view the invention consists in certain novel features of construction and combinations and arrangements of parts, as hereinafter set forth, and pointed out in the claims.

Figure 1:
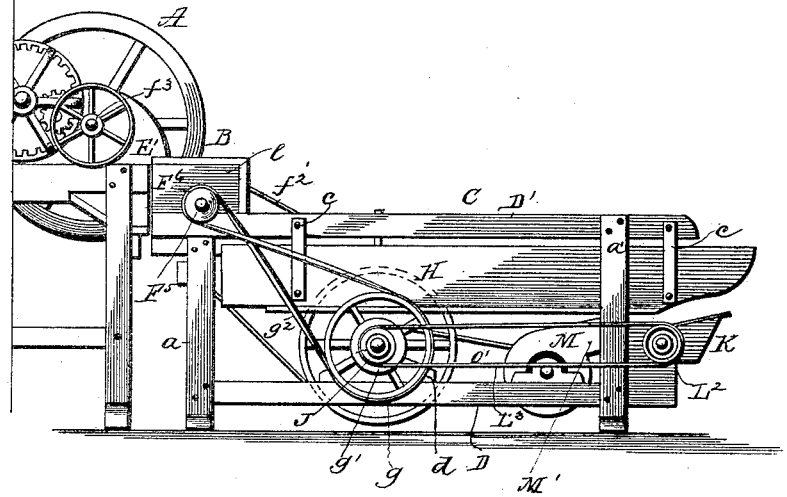
Figure 3:
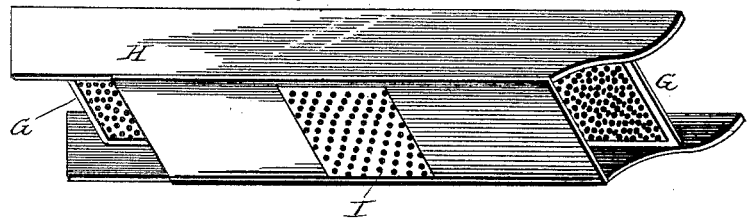
Figure 4:
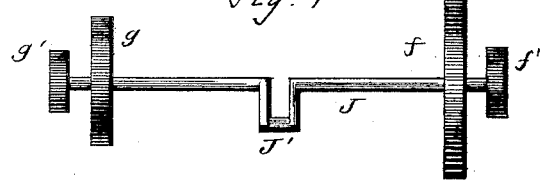

In the accompanying drawings, Figure 1 is an elevation of the combined apparatus. Fig. 2 is a longitudinal sectional view of the machine, the cutting apparatus being removed. Figs. 3 and 4 are views of certain details.

For convenience of illustration I will describe the machine as applicable for cutting cornstalks into feed and separating the corn from the cob and cleaning the same, although it is evident that the apparatus is equally as applicable for separating other grains from their stalks and cutting such stalks.

A represents a feed-cutter of any approved construction, and located in close proximity to such feed-cutter and preferably secured thereto is an apparatus B, for shelling the corn from the cob and cleaning the shelled corn, said apparatus being located in such position relatively to the cutter that the cut material from the cutter will be delivered into such apparatus, as presently explained.

The frame C of the apparatus B is composed, preferably, of four uprights $a\ a\ a'\ a'$, the uprights $a\ a'$ being connected together by longitudinal timbers D near their lower ends, and at or near their upper ends they are connected by longitudinal timbers $D'$. The uprights $a\ a$ are connected by cross-bars $D^2$. Located on one end of the frame C is a box E, so arranged as to receive cut or chopped material from the spout $E'$ of the cutter A. Journaled in the ends of the box E is a cylinder F, having teeth $F^2$ projecting from its periphery, and located in the box E in proximity to the cylinder F is a concave $F^3$, having teeth $F^4$ projecting therefrom and adapted to alternate with the teeth $F^2$ of the cylinder F. The shaft $F^5$ of the cylinder is extended beyond its bearing and provided with a band-wheel $F^6$, by means of which motion may be transmitted to the cylinder in a manner explained farther on. Thus it will be seen that a shelling apparatus is produced and is provided with an outlet $b$, adapted to discharge upon a sieve G in a shoe H. The shoe H is suspended by means of pivoted links $c$ from the timbers $D'$. The bottom of the shoe is closed, with the exception of a space preferably at its center, which space is covered with a sheet of perforated metal or wire-gauze I, through which any snow and water which may find its way into the shoe may be permitted to escape. The sieve G is located in proximity to the bottom of the shoe and is of such mesh as to allow the corn or other grain being operated on to pass through it and exclude other and larger substances.

Secured to the longitudinal timbers D are bearing-blocks $d$, in which the respective ends of a main or crank-shaft J are mounted, and keyed or otherwise secured to this shaft at its ends are band-wheels $f\ f'$ and $g\ g'$, respectively. The larger band-wheel $f$ is geared by means of a band $f^2$ with the main shaft $f^3$ of the cutter A, while the band-wheel $g$, at the opposite end of the shaft J, is geared by means of a crossed band $g^2$ with the band-wheel $F^6$ on the shaft $F^5$ of the cylinder F.

Journaled on the crank-arm J' of the shaft J is a link J², which link is pivotally connected at its forward end to the bottom of the shoe, or to a plate h, secured to said shoe. Thus it will be seen that when the shaft J is rotated the shoe H will be reciprocated or shaken through the medium of the crank J' and pivoted link J².

Located at the forward end of the frame C, and secured to the uprights a' immediately beneath the forward end of the shoe, is a hopper K. Journaled in this hopper at right angles to the longitudinal axis of the shoe is a worm conveyer L, adapted to convey grain from the hopper K, through one end thereof, into bags or other receptacles. The shaft L' of the conveyer L is extended beyond its bearing at one end and provided with a band-wheel L², which wheel is geared by means of a band L³ with the small band-wheel g' on the main or crank shaft J.

Located between the lower longitudinal timbers D, near the discharge end of the apparatus, is a fan-casing M, having a mouth M' projecting toward the discharge end and terminating in close proximity to the said discharge end of the shoe H. A fan N is located in the casing M, the shaft N' of said fan being journaled in suitable bearings located on the lower longitudinal timbers D. On one end of the shaft N' a small band-wheel O is secured, and geared by means of a band O' with the band-wheel f' on the main or crank shaft J.

In operating the combined apparatus above described motion is imparted to the main shaft of the cutter in any suitable manner, whereby the entire apparatus will be set in motion through the medium of the gearing above described. Cornstalks, including the ears of corn, will be introduced into the cutter in the usual way, and the whole will be cut into pieces of a size for which the cutter is adjusted. This cut or chopped material is discharged into the box or sheller E, where by the action of the cylinder F and concave F³ the grains of corn will be removed from the cob, and the whole of the material, including the corn and cut fodder and corn-cobs, will be discharged from the box E upon the screen G. This screen being continuously oscillated or shaken, the grains of corn will pass through the sieve G; but the chopped fodder, &c., being too large to pass through said sieve, and the sieve being inclined, such chopped material will find its way to the discharge end of the shoe, as will also the corn or other grain in the bottom of the shoe, and by the action of the blast produced by the fan the chopped material, being light, will be discharged beyond the discharge end of the machine. The corn will drop from the shoe into the hopper K, where it will be discharged by the action of the conveyer L into a bag or other receptacle.

By means of this apparatus the fodder is cut, the corn separated therefrom, cleaned, and ejected from the apparatus at different points without the necessity of handling the material after it has been introduced into the machine.

Slight changes might be made in the details of construction without departing from the spirit thereof or limiting its scope. Hence I do not wish to limit myself to the precise details of construction herein set forth.

Having fully described my invention, what I claim as new, and desire to secure by Letters Patent, is—

1. In a combined feed-cutter, thrasher, and separator, the combination, with a cutter and a cylinder and concave located below the cutter and adapted to receive the material discharged from the cutter, of a shoe having an approximately horizontal bottom, a screen longer than said bottom and located within the shoe above the bottom, a receptacle located below the discharge end of the bottom of the shoe, and a fan located in advance of the receptacle and adapted to discharge an air-blast between it and the discharge end of the shoe.

2. In a combined feed-cutter, thrasher, and separator, the combination, with a cutter and a cylinder and a concave located below the cutter and adapted to receive the material discharged from the cutter, of a shoe adapted to receive the material from the concave and cylinder, the said shoe having an approximately horizontal bottom, an opening in said bottom near the center thereof, a screen secured over said opening, a screen in said shoe over the bottom and projecting beyond the discharge end of said bottom, a receptacle adapted to receive the material from the bottom of said shoe, and a fan for discharging a blast of air between the discharge end of the shoe and the receptacle, substantially as set forth.

3. The combination, with a cutter, of a sheller, a suspended shoe, a crank-shaft, band-wheels on said shaft, a link connecting the crank-shaft and shoe, a band connecting a band-wheel on one end of the crank-shaft with the shaft of the cutter, and a band-wheel on the other end of the crank-shaft, connected with a band-wheel on the shaft of the sheller, substantially as set forth.

4. The combination, with a cutter, of a sheller, a shaking shoe, a main shaft, band-wheels on the ends of said shaft, a hopper, a conveyer in said hopper, a fan, a band connecting the shaft of the cutter and a band-wheel on the main shaft, a band connecting a band-wheel on the main shaft with a band-wheel on the shaft of the fan, and means connecting the main shaft with the sheller and conveyer, substantially as set forth.

5. The combination, with a cutter, of a shaking shoe, a main shaft, means connecting the shaft of the cutter with the main shaft to drive the latter, a hopper, a conveyer in said hopper, a band-wheel on the conveyer-shaft, a band-wheel on the main shaft, and a band connecting the band-wheel on the conveyer-shaft with the band-wheel on the main shaft, substantially as set forth.

6. The combination, with a cutter, of a sheller, a band-wheel on the shaft of the sheller, a shaking shoe, a main shaft, means connecting the shaft of the cutter with said main shaft, a hopper, a conveyer in said hopper, a band-wheel in the conveyer-shaft, two band-wheels on the main shaft, a band connecting one of said band-wheels on the main shaft with the band-wheel on the conveyer-shaft, and a band connecting the other band-wheel on the main shaft with the band-wheel on the sheller-shaft, substantially as set forth.

In testimony whereof I have signed this specification in the presence of two subscribing witnesses.

PHILLIP BRIGGS STILL.

Witnesses:
L. J. YOUNG,
HERBERT TOWNE.